(12) United States Patent
Zhou

(10) Patent No.: US 7,058,575 B2
(45) Date of Patent: Jun. 6, 2006

(54) INTEGRATING KEYWORD SPOTTING WITH GRAPH DECODER TO IMPROVE THE ROBUSTNESS OF SPEECH RECOGNITION

(75) Inventor: Guojun Zhou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 09/891,610

(22) Filed: Jun. 27, 2001

(65) Prior Publication Data

US 2003/0004721 A1 Jan. 2, 2003

(51) Int. Cl.
*G10L 15/04* (2006.01)

(52) U.S. Cl. .................. 704/251; 704/231; 704/270

(58) Field of Classification Search .................. 704/1, 704/231, 270, 251
See application file for complete search history.

(56) References Cited

U.S. PATENT DOCUMENTS

| | | | | |
|---|---|---|---|---|
| 5,956,675 | A * | 9/1999 | Setlur et al. | 704/231 |
| 6,044,337 | A * | 3/2000 | Gorin et al. | 704/1 |
| 6,185,535 | B1 * | 2/2001 | Hedin et al. | 704/270 |

* cited by examiner

*Primary Examiner*—W. R. Young
*Assistant Examiner*—Huyen X. Vo
(74) *Attorney, Agent, or Firm*—Guojun Zhou

(57) ABSTRACT

An arrangement is provided for integrating graph decoder with keyword spotting to improve the robustness of speech recognition. When a graph decoder based speech recognition mechanism fails to recognize a word sequence from input speech data, a keyword based speech recognition mechanism is activated to recognize the word sequence based on a set of keywords that are detected from the input data.

8 Claims, 8 Drawing Sheets

INTEGRATING KEYWORD SPOTTING WITH GRAPH DECODER TO IMPROVE THE ROBUSTNESS OF SPEECH RECOGNITION

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to speech processing. Other aspects of the present invention relate to speech understanding.

Most automated speech recognition systems employ a graph decoder to decode an acoustic feature sequence, measured from input speech data, into a word sequence that is allowed by an underlying language. A graph decoder may use acoustic models of words or phonemes (e.g., Hidden Markov Model or HMM) to translate an acoustic feature sequence into the most likely word sequence based on a language model that describes the allowed word sequences.

Such an automated speech recognition system with a graph decoder can recognize only word sequences that are explicitly allowed in the corresponding language model. This introduces limitations to the speech recognition system. For example, the sentence "change to channel two, please" may correspond to a valid word sequence according to a language model but the sentence "change to, umm, channel two, please" may not, even though the two sentences actually mean the same thing, both linguistically and semantically.

Different solutions have been used to improve the flexibility of a graph decoder based speech recognition system. In some recognition systems, different patterns of a same sentence may be explicitly modeled. In other recognition systems, the recognition of a word sequence may merely use the vocabulary without imposing any pre-defined sentence structure. In the former case, the modeling task may become overwhelming. In the latter case, the recognition result may become less meaningful because any word is now allowed to follow the previously recognized word even though most of the possible combinations may not correspond to meaningful sentences at all.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
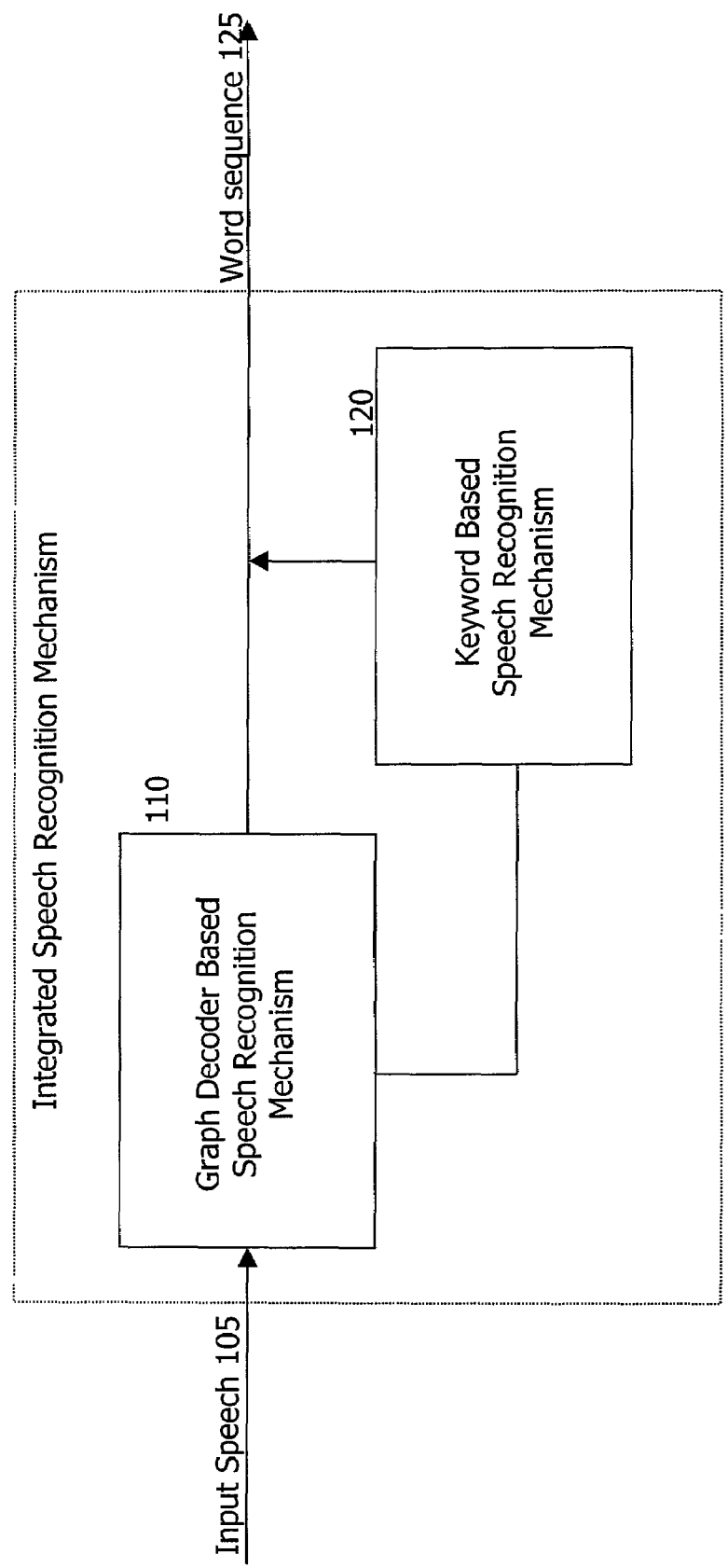
FIG. 1 is a high level system architecture of embodiments of the present invention.

FIG. 1 is a high level system architecture of embodiments of the present invention. An integrated speech recognition mechanism 100 comprises a graph decoder based speech recognition mechanism 110 and a keyword based speech recognition mechanism 120. The graph decoder based speech recognition mechanism 110 receives input speech data 105 and recognizes a word sequence 125. If the graph decoder based speech recognition mechanism 110 fails to generate the word sequence 125, the keyword based speech recognition mechanism 120 is activated to recognize the word sequence 125 based on at least some of the keywords detected from the input speech data 105.

In some speech recognition tasks, the number of word sequences that are recognizable by a speech recognizer is limited. One example application of such constrained speech recognition may be a home entertaining center where voice commands may be used to control home appliances. In this scenario, there may be a small set of commands such as "dim the light" or "lower the volume of the television". Each of such commands corresponds to a sequence of words. To understand these voice commands, a constrained speech recognizer may be deployed that recognizes spoken words according to a constrained language model that defines specific sequences of words, each of those sequences of words corresponds to a command. For example, the command "dim the light" is a sequence of three words "dim", "the", "light" that are arranged in a specified order or pattern.

In a generic speech recognition environment, when a transcription of speech data (corresponding to a sequence of words) is generated, the meaning or the semantics of a transcribed sequence of words may be unknown to the speech recognizer. Often, a language understanding module further analyzes the recognized sequence of words to interpret the semantics of the sequence of words.

In constrained speech recognition, recognition of a sequence of words may directly lead to understanding because association of sequences of words to the semantics of the sequences may be made prior to the recognition of spoken words. For example, in an automated voice controlled home entertainment center, there may be a total of 10 commands corresponding to 10 different sequences of words. In this case, each sequence of words (e.g., "lower the volume of the television") may have clearly defined semantics.

Figure 2:
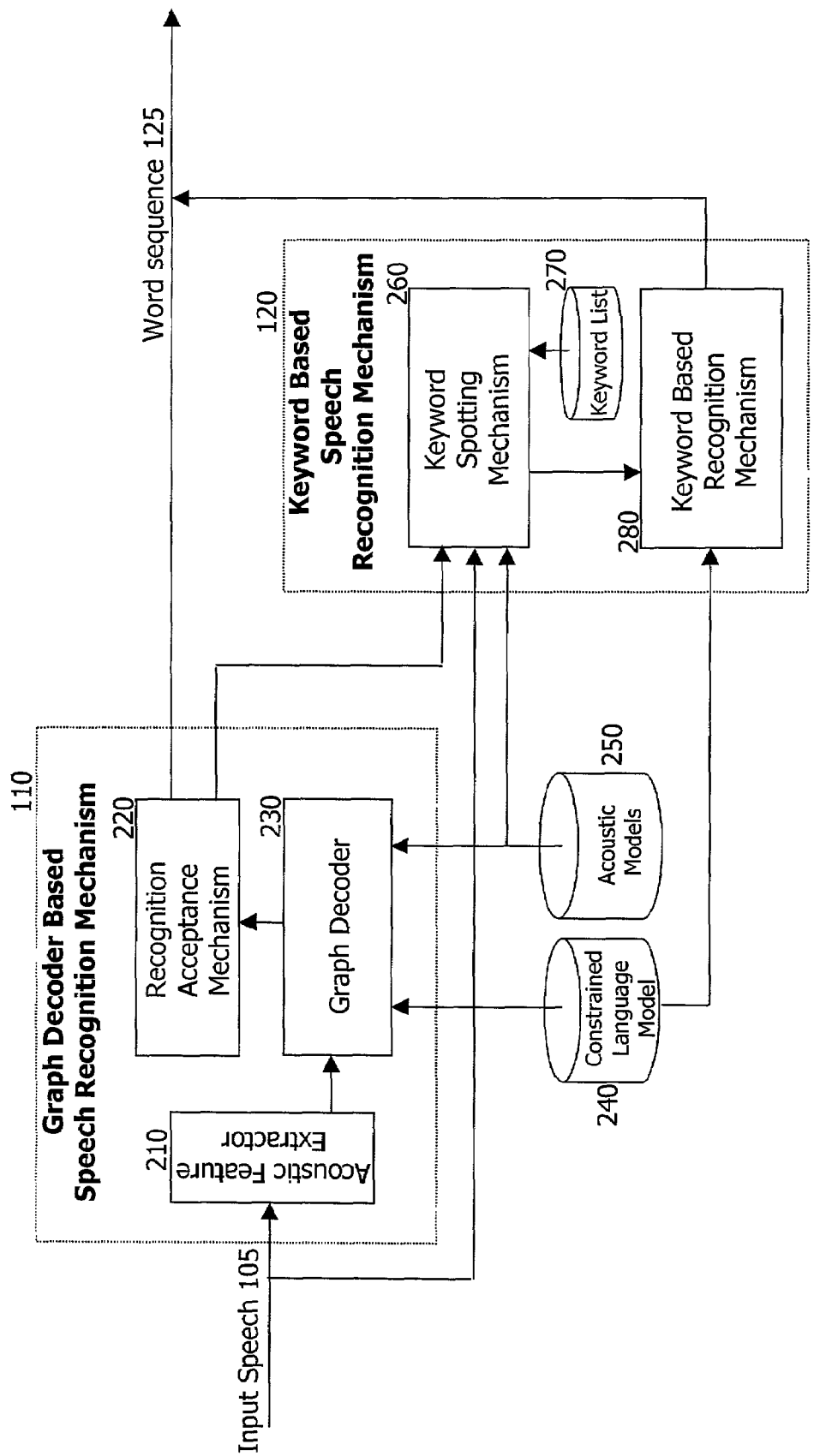
FIG. 2 illustrates an exemplary internal structure of an integrated speech recognition mechanism and the environment in which it operates, according to an embodiment of the present invention.

FIG. 2 illustrates an exemplary internal structure of the integrated speech recognition mechanism 100 and the environment in which it operates, according to an embodiment of the present invention. The graph decoder based speech recognition mechanism 110 comprises an acoustic feature extractor 210, a graph decoder 230, and a recognition acceptance mechanism 220. The acoustic feature extractor 210 measures certain pre-defined acoustic features from the input speech 105. Such extracted acoustic features are fed to the graph decoder 230 that recognizes sequences of words from the input speech 105 based on both acoustic models 250 and a language model 240.

The acoustic models 250 may be phoneme based, in which each word is modeled according to one or more phonemes. The acoustic models 250 are used to identify words from acoustic signals. A language model specifies allowed sequences of words that are consistent with the underlying language. A language model may be constructed based on finite state machines and specification of each allowed sequence of words in a language model may be statistical. The language model 240 in FIG. 2 may correspond to a generic language model or it may correspond to a constrained language model. The latter is similar to the former except that it may describe a much smaller set of allowed sequences of words. For instance, a language model used in an automated home entertainment environment may specify only 10 allowed sequences of words (corresponding to 10 commands). The language model 240 is used to recognize valid sequences of words.

Figure 3:
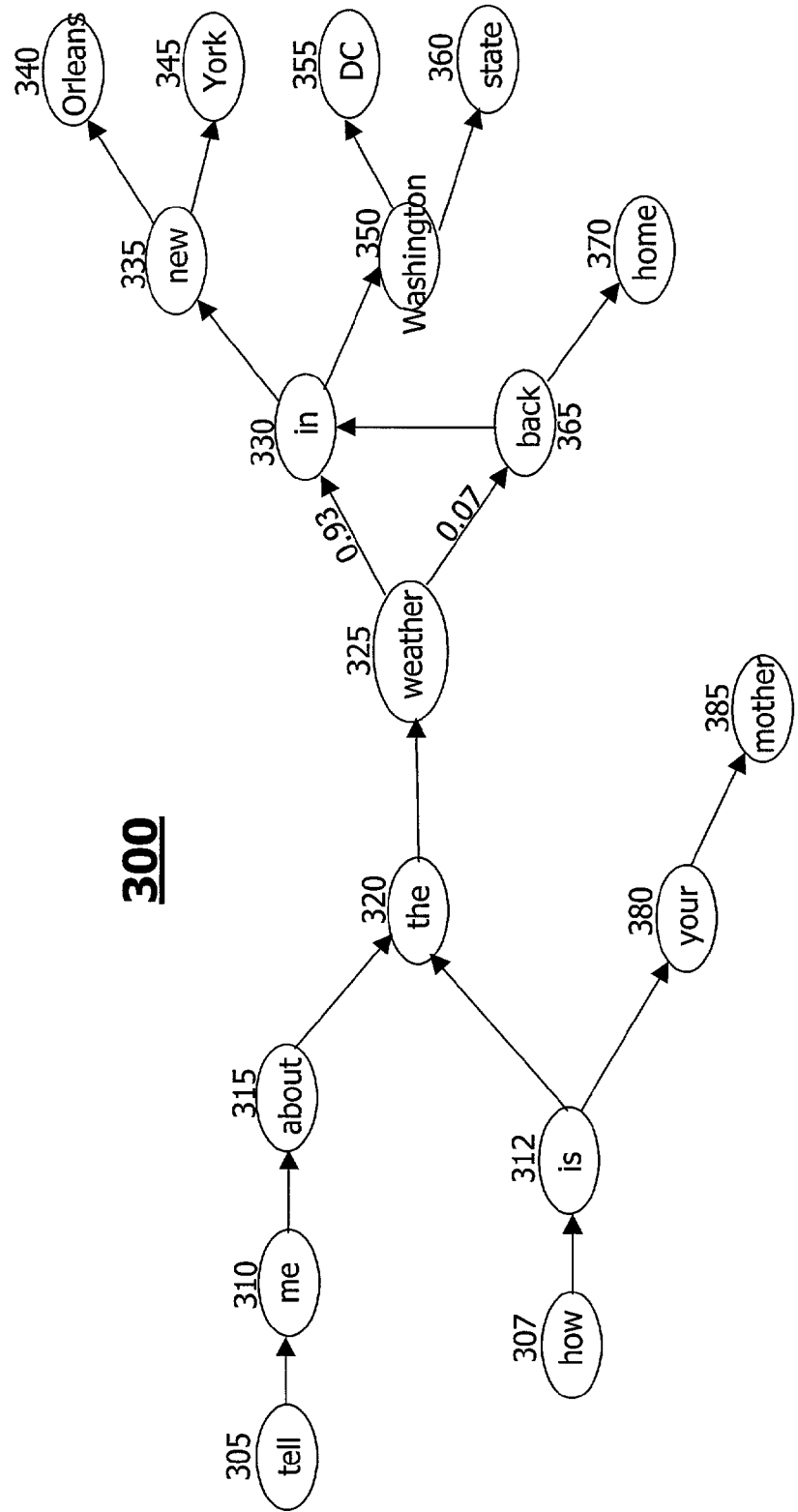
FIG. 3 shows an exemplary language model represented using a finite state machine.

FIG. 3 shows an exemplary language model expressed in a finite state machine 300. A finite state machine comprises a plurality of states and the transitions among different states. For example, node 305 is a state representing word "tell" which may transit to state 310 representing word "me". The finite state machine 300 includes multiple paths, each of which corresponds to an allowed sequence of words. For example, the path comprising states 305, 310, 315, 320, 325, 330, 335, and 345 corresponds to allowed sequence of words "tell me about the weather in New York"; while the path comprising states 307, 312, 320, 325, 330, 335, and 340 corresponds to allowed sequence of words "how is the weather in New Orleans".

Each state in a finite state machine may branch into different paths and each branching path may be specified (modeled) according to a probability. For example, in FIG. 3, state 325 corresponding to word "weather" may transit to two different states (depending on the input speech 105). One is state 330 corresponding to word "in" and state 365 corresponding to word "back", where the former transit is specified with a high probability 0.93 and the latter is specified with a low probability 0.07. Such probability may indicate that 93% of the time, people say ". . . weather in . . ." while only 7% of the time, people say ". . . weather back . . .". Such statistics may be obtained and incorporated into a language model based on statistical training.

Figure 4:
FIG. 4 shows an exemplary language, represented as a plurality of word sequences, derived from a language model.

A plurality of allowed sequences of words may be derived from the finite state machine 300. In FIG. 4, a total of 19 sequences of words are illustrated and they are the valid sequences of words allowed according to the exemplary language model described by the finite state machine 300.

The graph decoder 230 first recognizes individual spoken words based on the acoustic models 250 and then determines whether the sequence of the recognized words corresponds to an allowed sequence of words according to the language model 240. In constrained speech recognition, once a sequence of recognized words is identified as valid, the semantic meaning of the recognized word sequence 125 may be understood. In language model 240, there may be tags which mark the semantic meaning of recognized words.

With the graph decoder based speech recognition mechanism 110, a word sequence that is not explicitly modeled by the language model 240 may not be recognized. For instance, word sequence "how is the weather in New Jersey" will not be recognized using the language model illustrated in FIG. 3. In addition, if an individual word is recognized wrong, the overall sequence of words may be considered as invalid. For example, if word "weather" is misrecognized as "feather", the graph decoder may reject the entire word sequence "tell me about the feather in Washington state" as invalid. In this case, the graph decoder 230 may simply generate an error code to indicate a failure.

A word sequence may also be considered as invalid due to other reasons. For example, the graph decoder 230 may yield a confidence measure with respect to each recognized word sequence. Such a confidence measure may be designed to reflect how sure the recognition mechanism is regarding its recognition result. A low confidence measure may indicate that the recognition result may be questionable. In FIG. 2, the recognition acceptance mechanism 220 determines whether the graph decoder 230 is able to recognize a word sequence with reasonable confidence. The decision may be made based on the recognition result from the graph decoder 230, which may be an error code or a recognized word sequence associated with a confidence measure.

The recognition acceptance mechanism 220 may internally employ a threshold that specifies a minimum acceptable confidence level with respect to a recognition result. In this case, any recognized word sequence from the graph decoder 230 that has a confidence measure lower than the threshold may be considered as invalid. In this case, the recognized word sequence is not accepted and the recognition acceptance mechanism 220 may consider that the graph decoder 230 has failed.

In some applications, a word sequence may correspond to a question or a command, which requires an answer or reaction. For example, word sequence "lower the volume of the television" may trigger an automatic control mechanism to tune down the volume of the television. In those applications, failing to recognize a word sequence may significantly degrade the performance of the underlying system in which the automated speech recognition mechanism serves as a front-end interface.

Referring again to FIG. 2, in the integrated speech recognition mechanism 100, an alternative recognition mechanism, the keyword based speech recognition mechanism 120, is provided. Such an alternative recognition mechanism is activated by the recognition acceptance mechanism 220 whenever the graph decoder based speech recognition mechanism 110 fails (either error or low confidence) to recognize the word sequence 125 from the input speech 105.

In FIG. 2, the keyword based speech recognition mechanism 120 comprises a keyword spotting mechanism 260, a keyword list 270, and a keyword based recognition mechanism 280. In FIG. 2, the keyword spotting mechanism 260 detects one or more keywords that are included in the keyword list 270 from the input speech 105. The acoustic models 250 are used in detecting the keywords.

The keyword list 270 may include words that are substantially significant. The significance of a word may be determined according to application needs. For example, word "television" may be considered as significant in an application for automated control of home appliances. Word "weather" may be significant in a voice portal application that provides information services. On the other hand, words "the", "a", or "and" may not be significant in most of the applications.

Keyword spotting is a technique that recognizes individual spoken keywords (pre-determined) from a continuous speech. Word spotting yields a list of keywords that are often spotted at discontinuous locations yet arranged in certain order. For example, the list of detected keywords "lower . . . volume . . . television" may be detected from a continuous speech that corresponds to "lower the volume of the television". Similarly, the list of keywords ". . . weather . . . New Orleans" may be detected from a continuous speech that corresponds to "tell me about the weather in New Orleans".

Often, words are specified as keywords because they may be important in determining the meaning of an underlying sentence. This may be particularly so in constrained speech recognition. For example, assume there are a total of 10 commands (a constrained language) used in an automated voice based home appliance control and two of the commands related to television control, corresponding to either lower the volume or raise the volume of the television, if keywords "lower" and "television" are spotted from a continuous speech, the underlying command may be fairly confidently recognized as "lower the volume of the television". The recognition may be achieved even when some of the keywords are not detected (e.g., keyword "volume" is not detected in the above example) because there is only one command or one word sequence in the constrained language (10 commands) that contains both word "lower" and "television".

In the keyword based speech recognition mechanism 120, shown in FIG. 2, the keyword based recognition mechanism 280 recognizes the word sequence 125 based on a list of detected keywords. The keyword based recognition mechanism 280 may identify an allowed word sequence, according to the language model 240, that best matches the list of the detected keywords. The matching may be performed directly against the language model 240. For example, a search may be performed with respect to the language model 240 to identify a path in a finite state machine that comprises the states of words that are most consistent with the list of detected keywords. The consistency may be defined with respect to both the occurrences of the words and the order in which the words are arranged.

Figure 5:
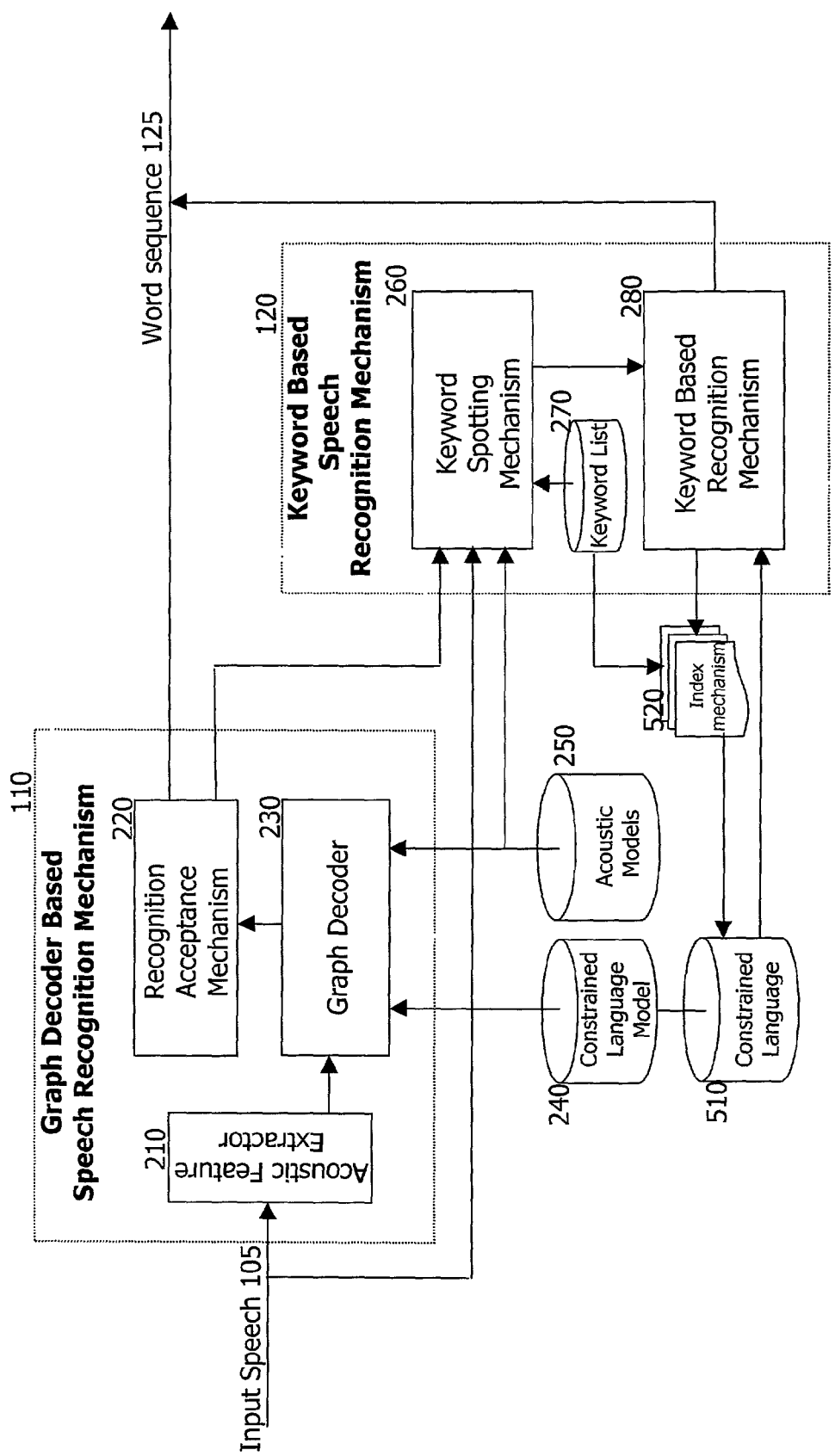
FIG. 5 illustrates a different exemplary embodiment of the internal structure of an integrated speech recognition mechanism and the environment in which it operates, according to an embodiment of the present invention.

Matching a list of keywords with a valid word sequence may also be performed against a list of all possible word sequences that are allowed by the language model 240. FIG. 5 illustrates different exemplary embodiments of the present invention, in which the keyword based speech recognition mechanism 120 in the integrated speech recognition mechanism 100 recognizes the word sequence 125 by matching a list of detected keywords with allowed word sequences of a language. In FIG. 5, a language 510 is derived from the language model 240. The language 510 corresponds to all the word sequences that are allowed according to the language model 240. An example of a language is illustrated in FIG. 4, which is derived from the exemplary language model (or finite state machine) 300 illustrated in FIG. 3.

The matching may be performed in a simple exhaustive search (if the number of allowed word sequences is reasonably small) or in an index based search (if the number of allowed word sequences is large). In an exhaustive search, the keyword based recognition mechanism 280 may simply match the list of detected keywords (from the keyword spotting mechanism 260) with each and every word sequence in the language 510. Each match may yield a matching score, which may be defined based on both the number of words that find a match and the degree of match with respect to the relative position of the matched words.

Matching result may correspond to a single best match or a set of matching word sequences. A best match may be identified as the one with the highest matching score. A set of matched valid word sequences may be identified as the matches whose scores are above a given threshold.

To facilitate index based search, indices to valid word sequences may be established prior to the search. In FIG. 5, an index mechanism 520 is established with respect to the keyword list 270 and is used to facilitate index based search. For each keyword in the keyword list, indices may be built that point to the word sequences in the language 510 that contain the keyword. It is also possible to establish indices based on a combination of keywords. Such indices may significantly reduce search space. For example, referring back to FIG. 4, the indices of single word "weather" point to almost all the valid word sequences. The indices of the combination of both "weather" and "New Orleans" point to only four valid word sequences (410, 420, 430, and 440).

Figure 6:
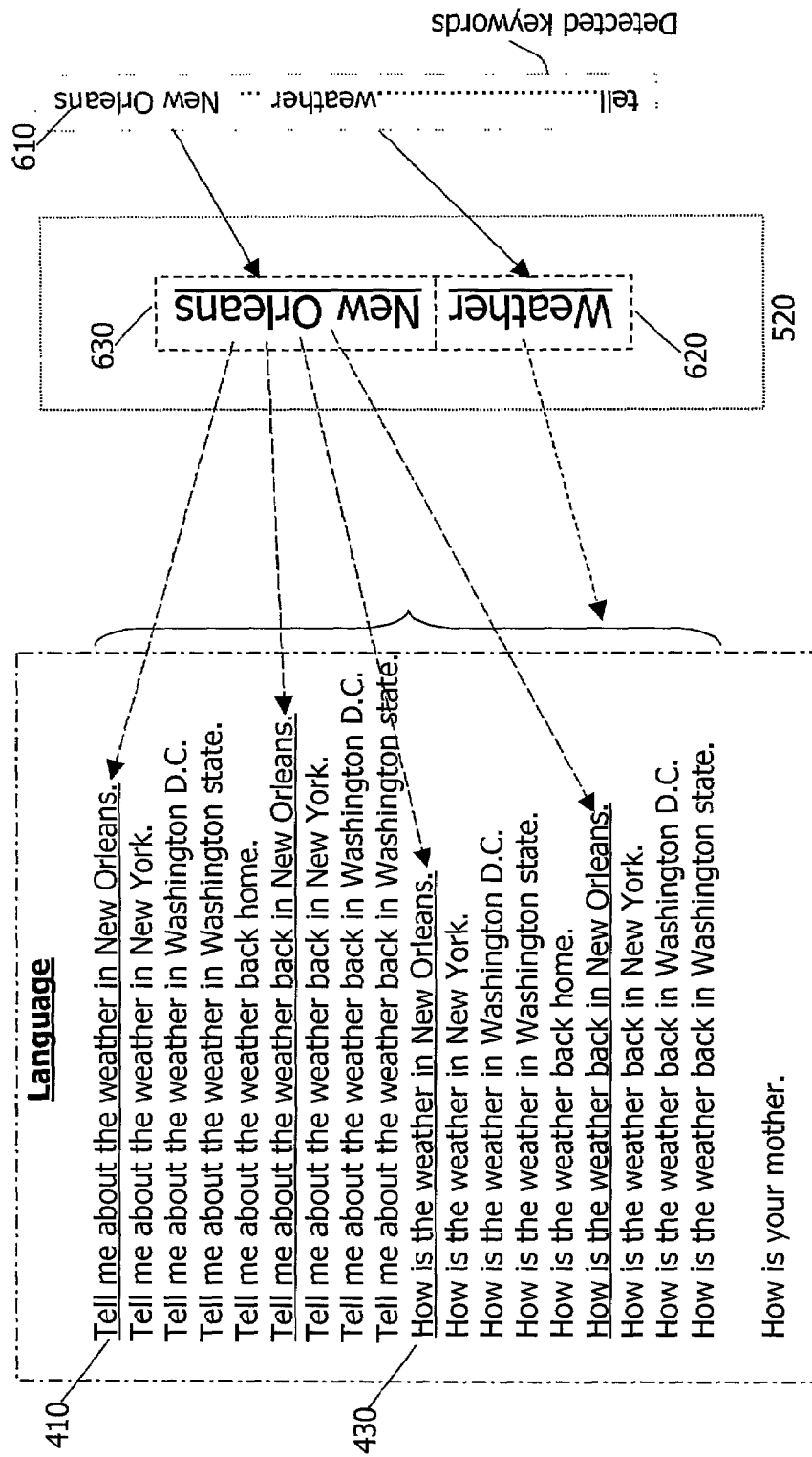
FIG. 6 illustrates an example of matching a list of keywords with a word sequence in a language.

With such established indices, to search for a match, the keyword based recognition mechanism 280 may first identify relevant indices from index mechanism 520 (FIG. 5) and then match a list of detected keywords with the word sequences that are retrieved from the language 510 using the indices. This is illustrated in FIG. 6. In FIG. 6, an exemplary list of detected keywords is "tell . . . weather . . . New Orleans. . .". The index for word "weather" points to 12 out of 13 allowed word sequences. The combination of "weather" and "New Orleans" points to only 4 allowed word sequences. By matching "tell . . . weather . . . New Orleans" to the four indexed word sequences, only two matches are found ("tell me about the weather in New Orleans" and "tell me about the weather back in New Orleans"). Although different, both word sequences may have the same semantics.

Figure 7:
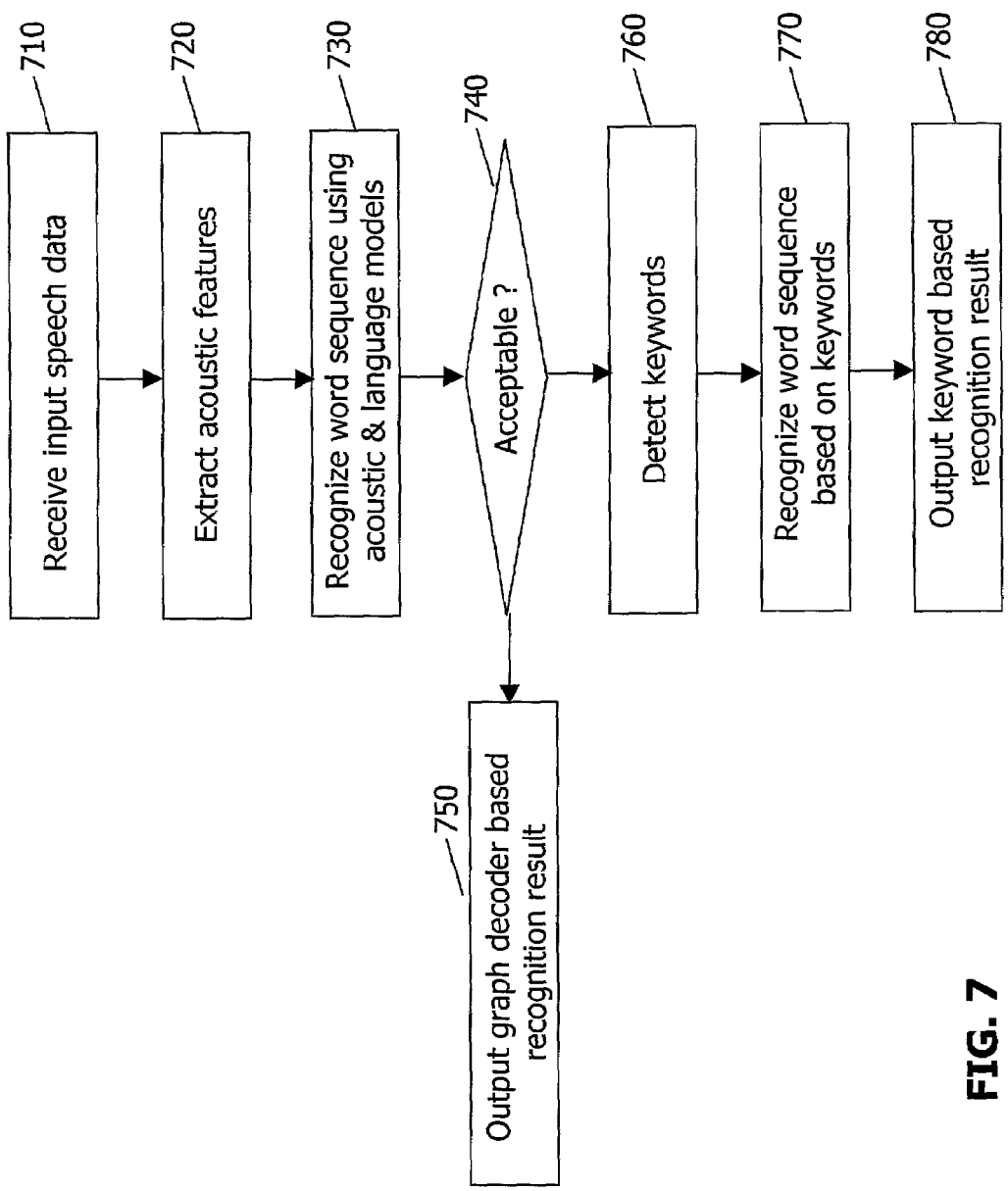
FIG. 7 is an exemplary flowchart of a process, in which an integrated speech recognition mechanism improves the robustness of speech recognition by combining a graph decoder based recognition mechanism with a keyword based recognition mechanism, according to an embodiment of the present invention.

FIG. 7 is an exemplary flowchart of a process, in which the integrated speech recognition mechanism 100 improves the robustness of speech recognition by combining the graph decoder based recognition mechanism 110 with the keyword based recognition mechanism 120. Input speech data 105 is first received at act 710. The acoustic feature extractor 210 extracts, at act 720, various acoustic features from the input speech data. Based on the acoustic features, the graph decoder 230 recognizes, at act 730, a word sequence, using the language model 240, from the input speech data based on the acoustic features. The recognition result is evaluated at act 740. If the result is acceptable, the recognized word sequence from the graph decoder is outputted, at act 750, as recognition result.

If the recognition result from the graph decoder based speech recognition mechanism 110 is not acceptable, determined at act 740, the keyword based speech recognition mechanism 120 is activated. The keyword spotting mechanism 260 detects, at act 760, keywords, using the acoustic models 250, from the input speech data. The list of detected keywords are then used to recognize, at act 770, whether the underlying sentence corresponds to a valid word sequence. A valid word sequence may be identified by matching the list of detected keywords with the word sequences allowed by the language model 240. The recognition result from the keyword based speech recognition mechanism is outputted, at act 780, as the recognition result.

Figure 8:
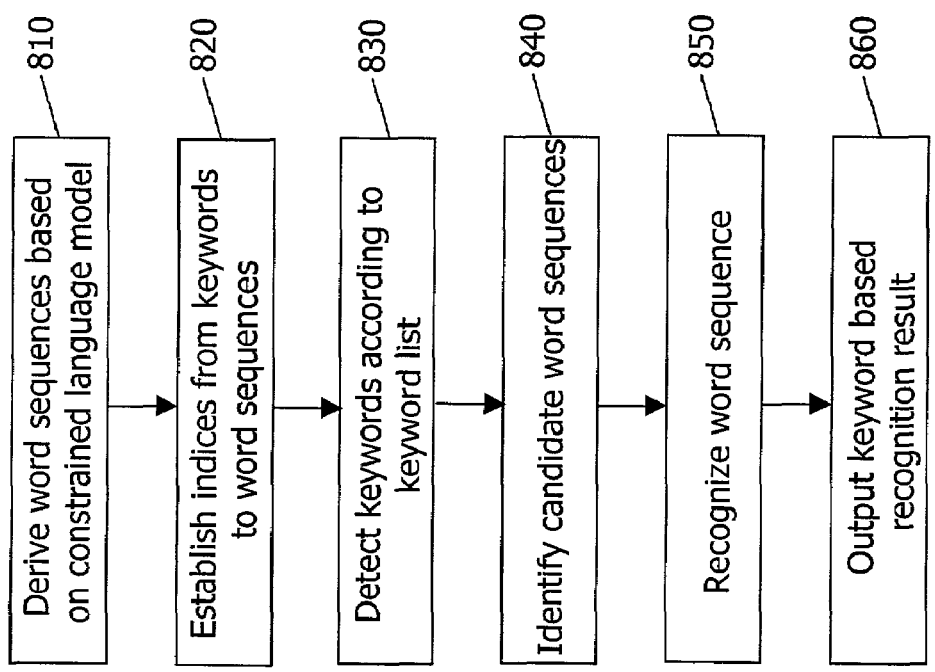
FIG. 8 is an exemplary flowchart of a process, in which a keyword based speech recognition mechanism recognizes a word sequence based on spotted keywords according to an embodiment of the present invention.

FIG. 8 is an exemplary flowchart of a process, in which the keyword based speech recognition mechanism 120 uses a list of detected keywords to recognize valid word sequences based on appropriately established indices. The appropriate indices that link keywords to valid word sequences are established priori to keyword based speech recognition. Valid word sequences are first derived, at act 810, from the language model 240. Indices to the valid word sequences are established, at act 820, with respect to the keyword list 270.

When the keyword based speech recognition mechanism 120 is activated, a list of keywords is first detected, at act 830 using the acoustic models 250, from the input speech data based on the keyword list 270. Using the indices between the keywords and the valid word sequences, candidate word sequences containing detected keywords are identified at act 840. One or more word sequences may be recognized, at act 850, from the candidate word sequences that match with the detected list of keywords. Such matched word sequence is outputted, at act 860, as recognition result.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A system, comprising:
   a graph-decoder based speech recognition mechanism for recognizing a word sequence, from input speech data, based on a language model using a graph decoder, the graph-decoder based speech recognition mechanism having a recognition acceptance mechanism to determine whether the graph decoder based speech recognition mechanism fails; and
   a keyword based speech recognition mechanism for recognizing, when the graph-decoder based speech recognition mechanism fails, the word sequence, the keyword based speech recognition mechanism including:
      a keyword spotting mechanism to detect, using at least one acoustic model, at least one keyword from the input speech data based on a keyword list; and
      a keyword based recognition mechanism to recognize the word sequence using the at least one keyword, detected by the keyword spotting mechanism, based on the language model.

2. The system according to claim 1, wherein the graph decoder based speech recognition mechanism comprises:
   a graph decoder for recognizing the word sequence from the input speech data based on at least one acoustic feature to generate a recognition result, the recognizing being performed according to the at least one acoustic model and the language model; and
   the recognition acceptance mechanism for determining whether to accept the recognition result generated by the graph decoder based speech recognition mechanism or to activate, when the recognition result from the graph decoder based recognition mechanism is not accepted, the keyword based speech recognition mechanism.

3. The system according to claim 1, further comprising an acoustic feature extractor to extract the at least one acoustic feature from the input speech data.

4. The system according to claim 2, wherein the keyword spotting mechanism is activated by the recognition acceptance mechanism if the recognition result from the graph decoder based recognition mechanism is not accepted.

5. A method, comprising:
   recognizing, by a graph decoder, a word sequence from input speech data based on at least one acoustic features, the recognizing being performed using at least one acoustic model and a language model;
   determining, by a recognition acceptance mechanism, whether to accept the word sequence or to activate a keyword spotting mechanism;
   detecting, by the keyword spotting mechanism when activated, at least one keyword, according to a keyword list, from the input speech data based on the at least one acoustic model; and
   recognizing, by a keyword based recognition mechanism, the word sequence using the at least one keyword based on the language model.

6. The method according to claim 5, further comprising:
   receiving the input speech data; and
   extracting, by an acoustic feature extractor, the at least one acoustic feature from the input speech data.

7. A computer-readable medium encoded with a program, the program, when executed, causing:
   recognizing, by a graph decoder, a word sequence from input speech data based on at least one acoustic features, the recognizing being performed using at least one acoustic model and a language model;
   determining, by a recognition acceptance mechanism, whether to accept the word sequence or to activate a keyword spotting mechanism;
   detecting, by the keyword spotting mechanism when activated, at least one keyword, according to a keyword list, from the input speech data based on the at least. one acoustic model; and
   recognizing, by a keyword based recognition mechanism, the word sequence using the at least one keyword based on the language model. model.

8. The medium according to claim 7, the program, when executed, further causing:
   receiving the input speech data; and
   extracting, by an acoustic feature extractor, the at least one acoustic feature from the input speech data.

* * * * *